US006631876B1

(12) United States Patent
Phillips

(10) Patent No.: US 6,631,876 B1
(45) Date of Patent: Oct. 14, 2003

(54) PLASTIC SUPPORT DEVICES ESPECIALLY FOR PIPES AND CABLES

(75) Inventor: Raymond John Phillips, Alton (GB)

(73) Assignee: Rapid Positioning Clips Limited, Bordon (GB)

( * ) Notice: Subject to any disclaimer, the term of this patent is extended or adjusted under 35 U.S.C. 154(b) by 0 days.

(21) Appl. No.: 09/485,696

(22) PCT Filed: May 8, 1998

(86) PCT No.: PCT/GB98/01331
§ 371 (c)(1),
(2), (4) Date: Feb. 25, 2000

(87) PCT Pub. No.: WO99/11959
PCT Pub. Date: Mar. 11, 1999

(30) Foreign Application Priority Data

Aug. 28, 1997 (GB) ............................................. 9718247

(51) Int. Cl.$^7$ ................................................. F16L 3/08
(52) U.S. Cl. ................................ 248/74.2; 248/229.16
(58) Field of Search ....................... 248/229.16, 229.26, 248/230.7, 231.81, 73, 74.1, 74.2, 62, 560, 316.1; 52/677, 686

(56) References Cited

U.S. PATENT DOCUMENTS

| 1,495,189 A | 5/1924 | Mack |
| 1,601,612 A | 9/1926 | Edwards |
| 2,333,388 A | 11/1943 | Poupitch ........................ 151/7 |
| 2,942,314 A | 6/1960 | Debner et al. ................. 24/129 |
| 3,006,231 A | 10/1961 | Kahn ............................. 85/32 |
| 3,423,055 A | 1/1969 | Fisher .......................... 248/73 |
| 3,836,106 A * | 9/1974 | Gary ........................... 248/229 |
| 3,913,187 A | 10/1975 | Okuda .......................... 24/255 |
| 4,305,557 A | 12/1981 | Kowalski ...................... 248/62 |
| 4,473,205 A | 9/1984 | Rumble ........................ 248/58 |
| 4,548,327 A | 10/1985 | Kilkelly ....................... 211/187 |
| 4,550,891 A | 11/1985 | Schäty ........................ 248/68.1 |
| 4,646,998 A | 3/1987 | Pate ............................ 248/250 |
| 4,722,648 A | 2/1988 | Camilleri ..................... 411/340 |
| 4,805,479 A * | 2/1989 | Brightwell .................. 248/74.2 |
| 4,850,396 A * | 7/1989 | McClish et al. ............. 138/103 |
| 4,861,081 A | 8/1989 | Satoh ........................ 292/336.3 |
| 5,024,405 A | 6/1991 | McGuire ...................... 248/73 |
| 5,149,040 A | 9/1992 | Heath .......................... 248/300 |
| 5,351,920 A | 10/1994 | Decky et al. ................. 248/73 |
| 5,695,162 A * | 12/1997 | DiCastro ............... 248/231.81 |
| 6,073,896 A * | 6/2000 | McFadden ............. 248/231.81 |
| 6,321,524 B1 * | 11/2001 | Bro ............................. 248/49 |

FOREIGN PATENT DOCUMENTS

| DE | 23 34 913 | 1/1975 |
| DE | 43 09 210 | 9/1993 |
| FR | 2 613 813 | 10/1988 |
| GB | 1 371 850 | 10/1974 |
| JP | 08-121655 | 5/1996 |
| JP | 08-121656 | 5/1996 |

* cited by examiner

Primary Examiner—Gwendolyn Baxter
(74) Attorney, Agent, or Firm—Jacobson Holman PLLC

(57) ABSTRACT

A rod-engaging support device (1) is formed from plastics material. The body (2) of the device (1) supports a fitting e.g. rod connector, suspension hook or munsen ring, which fitting may be integral or removably securable thereto. The device (1) further incorporates rod engagement means (4, 5) wherein the rod is received by the engagement means (4, 5) in a first position and following relative rotation of the device (1) with respect to the rod, the rod is gripped by the engagement means (4, 5) in a second position.

5 Claims, 3 Drawing Sheets

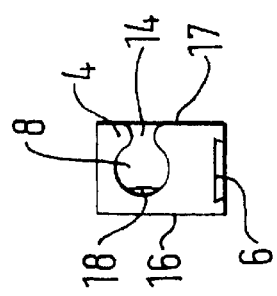
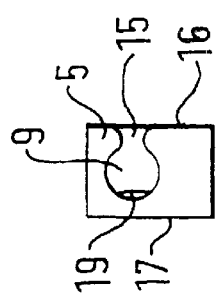
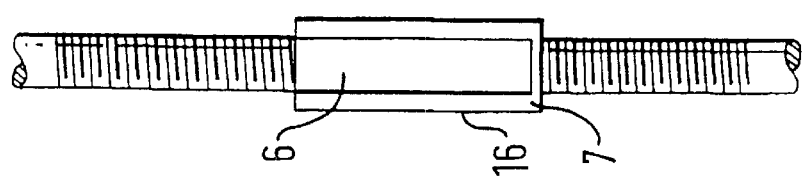
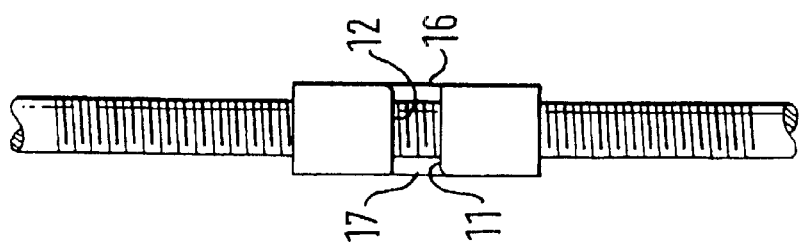
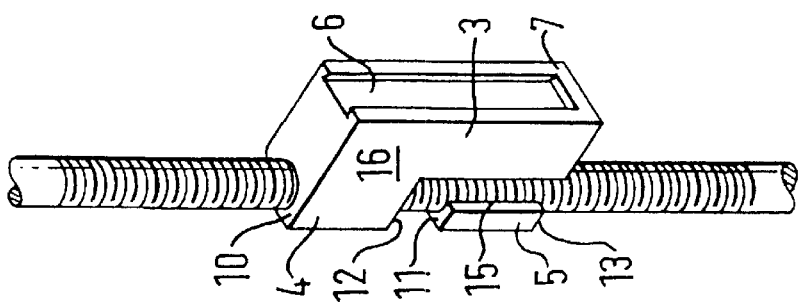
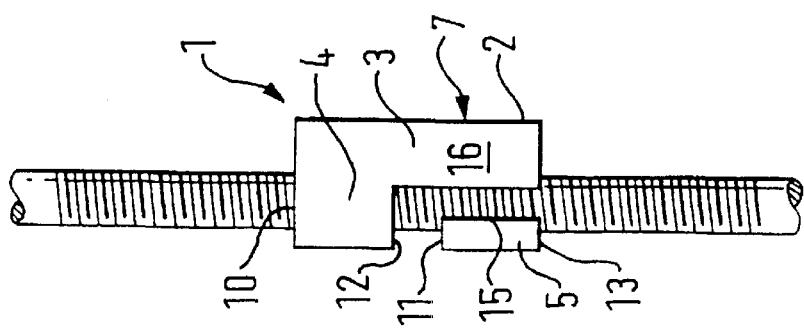

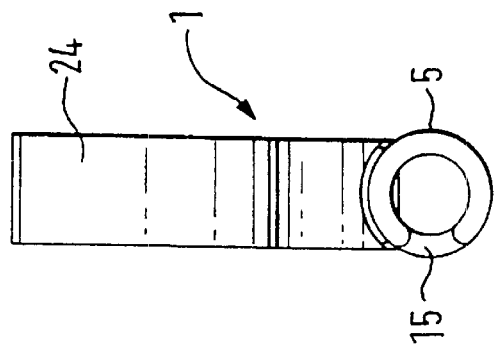
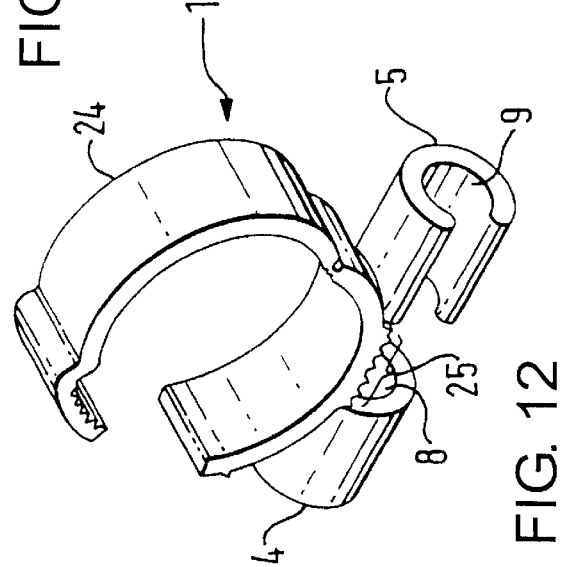
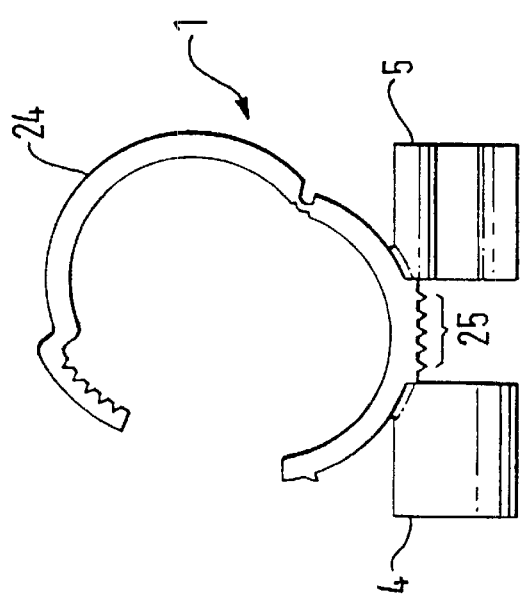
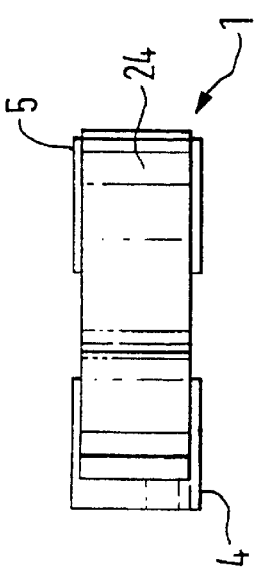

PLASTIC SUPPORT DEVICES ESPECIALLY FOR PIPES AND CABLES

The present invention relates to a support for elongate members particularly, although not exclusively, overhead pipework and cabling.

Conventionally, pipework and cabling has been suspended above false ceilings by means of simple, usually metallic, fittings threadingly engaged on studs or rods depending from the ceiling. Such fittings have often been inconvenient to use as well as relatively expensive to manufacture. Previously, different types of fittings have been manufactured to support different loads for example pipework or cabling.

It thus an object of the present invention to provide an improved support device which overcomes the disadvantages of the prior art and which furthermore allows one-handed installation and in addition may also be secured to unthreaded rods and the like.

According to the present invention, there is provided a rod engaging support device, which device comprises a plastics material body incorporating rod engagement means and which may be formed with either an integral or removable fitting.

Preferably the rod engagement means takes the form of a pair of spaced apart hooked fingers, such that, in use, the rod is received between the fingers in a first orthogonal position and following rotation to a second orthogonal position is gripped by the fingers. Alternatively the rod engagement means may be provided by a captive nut moulded into the body.

Where the device is not formed with a fitting as a unitary moulding, the device may include reception means formed on one or more sides of the device such that a suitable fitting or fittings can be attached thereto. Clearly, the fitting may be of any type limited only by the fact that where the fitting forms a separate element, it is provided with complementary means for engaging with the reception means. It will faker be noted that where additional security is required and particularly where the rod is threaded, the device may incorporate friction means, advantageously in the form of a grooved or serrated surface which contacts the rod and in the case of a threaded rod, engages in thread.

In order to aid in understanding the invention a number of embodiments thereof will now be described by way of example and with reference to the accompanying drawings, in which:

FIG. 1 is a side view of a support device according to the invention shown attached to a threaded rod;

FIG. 2 is a perspective view of the device of FIG. 1;

FIG. 3 is a front elevation view of the device of FIG. 1;

FIG. 4 is a rear elevation view of the device of FIG. 1;

FIG. 5 is a plan view of the device of FIG. 1, with the rod omitted for clarity;

FIG. 6 is an underside view of the device of FIG. 1, again with the rod omitted for clarity;

FIG. 11 is a side view of a support device according to a variant of the first embodiment of the invention;

FIG. 12 is an perspective view of the device of FIG. 11;

FIG. 13 is an end view elevation of the device of FIG. 11;

FIG. 14 is a plan View of the device of FIG. 11;

Figure 9:
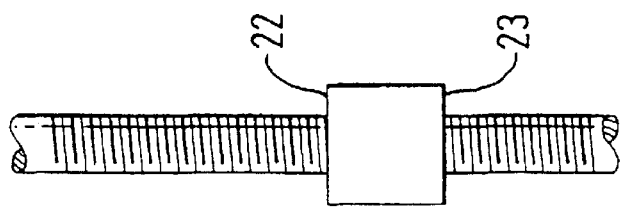
FIG. 9 is an end view elevation of the device of FIG. 7.
Figure 10:
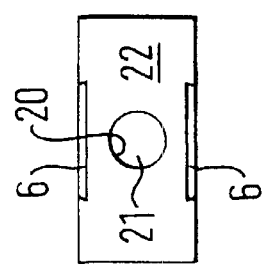
FIG. 10 is a plan view of the device of FIG. 7.

The support device 1 shown in FIGS. 1 to 6 of the drawings is an injection moulded body 2 formed from a suitable plastics material. The body 2 is generally C-shaped with a vertical portion 3 interconnecting a pair of horizontal limbs or fingers 4,5.

The vertical portion 3 is formed with an undercut blind slot 6 on its rear surface 7. The slot 6 is so proportioned to receive, as a sliding interference fit, the basal portion of a selected complementary fitting (not shown). The basal portion has substantially the same cross-sectional configuration as the slot 6 and provides support, as will be clear to anyone skilled in the art, for any number of conventional fittings including, but not limited to, rod connectors, suspension hooks, and munsen rings.

The fingers 4,5 each define a circular bore 8,9 extending between respective upper 10,11 and lower 12,13 surfaces thereof. Each bore 8,9 communicates with a slit 14,15 running the entire width of the respective finger 4,5. The slits 14,15 are on opposite sides 16,17 of the body 2. Consequently, when the device 1 is offered up to a rod in a first orthogonal position the rod passes into a region between the lower and upper surfaces 11,12 of the respective fingers 4,5 and by rotating the device to a second orthogonal position, the rod is snapped through the slit 14,15 in each finger 4,5 and thereby retained within the corresponding bore 8,9. To permit the device 1 to be wound along the thread, the body 2 further includes a small protrusion 18,19 into one or more of the bores 8,9 so sized to engage with the thread in the second orthogonal position.

Finally, it should be noted that although the present embodiment shows a support device secured to a threaded rod, it has been found that the device is equally effective when used with an unthreaded rod. Thus, it has been found that the grip provided by the fingers 4,5 together with the frictional properties of the plastics material are sufficient to support a fitting bearing a practical load.

Figure 8:
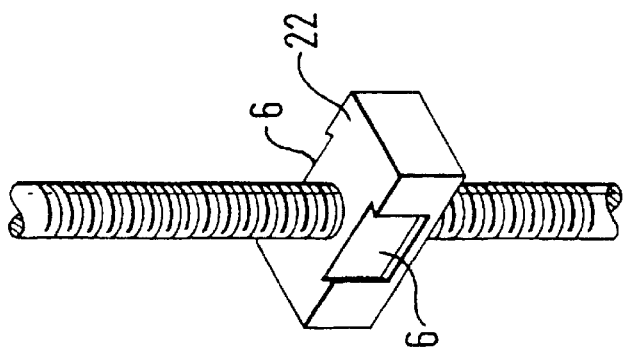
FIG. 8 is a perspective view of the device of FIG. 7.
Figure 7:
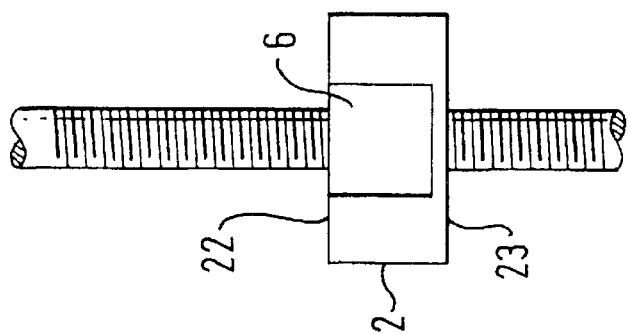
FIG. 7 is a side view of a support device according to a second embodiment of the invention shown attached to a threaded rod.

In the second embodiment shown in FIGS. 7 to 9, like numerals are used to reference equivalent parts. However, instead of a pair of thread engaging fingers, the body 2 is formed around a captured nut 20 which is coaxial with a bore 21 passing between upper 22 and lower 23 surfaces of the device 1. Thus the bore 21 is simply introduced to a free end of the rod and wound along its thread to the desired position thereon.

In a variant of the first embodiment shown in FIGS. 11 to 14, once again like numerals are used to reference equivalent parts. However, instead of a providing the support device 1 with means for engaging a separate fitting, the fitting, which in the present embodiment takes the form of a cable clip 24, is formed integrally with the support device 1. It will, of course, be appreciated by those skilled in the art that the device may be formed any desired type of fitting and is therefore not limited to a cable clip. Furthermore, the present embodiment of the invention incorporates the optional additional feature of a serrated friction portion 25 positioned between the fingers 4,5 on the interconnecting vertical portion 3 of the body 2. The friction portion 25 is intended to frictionally engage with the rod and thereby assist in preventing the support device 1 from slipping along the rod when the fitting is under load. The device of the present embodiment has been found to be effective with both threaded and unthreaded rods.

It will be appreciated by those skilled in the art that the present invention permits one handed attachment of a support device to rods. This is a valuable benefit when it is realised that such devices are frequently installed close to the ceiling of a building whilst the installer is standing on a ladder or such-like. Furthermore, the first embodiment of the invention and its variant are particularly useful where it is not possible or convenient to have access to a free end of a rod as their construction permits the device to be installed at any point along the rod and in the case of a threaded rod simply wound along the rod to the desired position.

What is claimed is:

1. A single-piece rod-engaging plastic support device for supporting a fitting and having a body comprising rod engagement means for receiving a rod in a first position and, following relative rotation of the device with respect to the rod, gripping the rod by the engagement means in a second position, and wherein the rod engagement means comprises a pair of spaced-apart partial cylinders having an interconnecting portion with rod engaging friction means, a common axis, and C-shaped cross-sections with oppositely directed openings, the C-shaped cross-sections having an internal diameter which is greater than the oppositely directed openings; the device integrally comprising a separate fitting in cable clip form having an upper and lower portion and which has an axis perpendicular to that of the spaced-apart partial cylinders and parallel to a plane bisecting the oppositely directed openings; the interconnecting portion being integral with the lower portion of said separate fitting.

2. A support device as claimed in claim 1, wherein the rod engaging friction means comprises a small protrusion on the body which engages with the rod.

3. A support device as claimed in claim 1, wherein the rod engaging friction means comprises a grooved or serrated surface located on a surface which contacts the rod in use.

4. A support device as claimed in claim 3, wherein the rod engaging friction means comprises a serrated surface located on a surface which contacts the rod in use.

5. A rod-engaging support device as claimed in claim 1 wherein the interconnecting portion has an outwardly-facing serrated surface.

* * * * *